United States Patent
Ikeda

(10) Patent No.: US 7,266,575 B2
(45) Date of Patent: Sep. 4, 2007

(54) RANDOM NUMBER GENERATOR WHICH CAN GENERATE A RANDOM NUMBER BASED ON AN UNIFORM DISTRIBUTION

(75) Inventor: Jun Ikeda, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 721 days.

(21) Appl. No.: 10/094,020

(22) Filed: Mar. 8, 2002

(65) Prior Publication Data

US 2002/0159590 A1    Oct. 31, 2002

(30) Foreign Application Priority Data

Mar. 12, 2001 (JP) .............................. 2001-069401

(51) Int. Cl.
*G06F 1/02* (2006.01)
(52) U.S. Cl. ...................................... 708/250
(58) Field of Classification Search ......... 708/250–256
See application file for complete search history.

(56) References Cited

U.S. PATENT DOCUMENTS

| | | | |
|---|---|---|---|
| 3,777,278 A * | 12/1973 | Majeau et al. .............. | 708/252 |
| 4,791,594 A | 12/1988 | Harney et al. | |
| 5,065,256 A | 11/1991 | Suganuma et al. | |
| 5,187,676 A * | 2/1993 | DeVane ...................... | 708/251 |
| 5,428,561 A | 6/1995 | Bryant et al. | |
| 5,757,923 A * | 5/1998 | Koopman, Jr. .............. | 708/250 |
| 6,415,309 B1 | 7/2002 | Shilton | |
| 6,430,170 B1 * | 8/2002 | Saints et al. ................. | 708/250 |
| 6,625,199 B1 * | 9/2003 | McDonough ............... | 708/250 |
| 6,785,389 B1 * | 8/2004 | Sella et al. .................. | 708/252 |
| 2003/0050943 A1 * | 3/2003 | Ikeda et al. .................... | 708/3 |

FOREIGN PATENT DOCUMENTS

| | | |
|---|---|---|
| EP | 0 388 131 | 9/1990 |
| EP | 0 828 349 | 3/1998 |
| JP | 11-184676 | 7/1999 |
| WO | WO 00/38037 | 6/2000 |

OTHER PUBLICATIONS

Partial European Search Report dated Mar. 6, 2006, for corresponding European Application No. 02090102.1.
European Search Report dated Sep. 6, 2006, for corresponding European Application No. 02090102.1-2212.

* cited by examiner

*Primary Examiner*—Chat C. Do
(74) *Attorney, Agent, or Firm*—Katten Muchin Rosenman LLP

(57) ABSTRACT

A random number generator includes a random pulse generator, a scrambler and a counter. The random pulse generator generates a plurality of random pulses. The scrambler generates an initial value. The counter generates a random number code based on the initial value and a temporal interval of the plurality of random pulses. The initial value is varied, and the initial value is not a fixed value.

6 Claims, 18 Drawing Sheets

RANDOM NUMBER GENERATOR WHICH CAN GENERATE A RANDOM NUMBER BASED ON AN UNIFORM DISTRIBUTION

BACKGROUND OF THE INVENTION

1. Field of the Invention

The present invention relates to a random number generator. More particularly, the present invention relates to a random number generator which can generate a random number based on an uniform distribution.

2. Description of the Related Art

A random number generated by a mathematic program has the possibility of occurrence of cyclic property or reproduction property. For this reason, a random number generator is desired for generating a random number by using a physical phenomenon.

In a natural random number generation card disclosed in Japanese Laid Open Patent Application (JP-A-Heisei 11-184676), alpha rays randomly radiated from an atomic nucleus are detected by using a PIN diode, and random pulses are generated, and those pulses are used to generate a true random number. A new method of generating one physical random number from one decay phenomenon uses an extremely slight dose, and generates a physical random number having a necessary number of digits at a necessary speed. A trouble is detected by comparing the number of measured pulses with the number of firstly set standard pulses, and the usage limit is also set.

Such a natural random number generation card is used to use the random phenomenon, such as the decay of the atomic nucleus, and then generate a physical random number on which an artificial operation or a decoding operation can not be performed, and thereby authenticate a person or encrypt a data. Security can be improved by a self-detection of an illegal usage or a set of a usage limit on a card.

A known random number generator 101 shown in FIG. 1 is provided with a random pulse generator 102, a clock generator 103, a time measuring unit 104 and a random number holder 105. The time measuring unit 104 has a counter 107. The random pulse generator 102 is connected to the counter 107 of the time measuring unit 104. The clock generator 103 is connected to the counter 107 of the time measuring unit 104. The counter 107 is connected to the random number retainer 105.

The random pulse generator 102 outputs a random pulse 111 that is a pulse having no cyclic property. The random pulse generator 102 has a resistor, an amplifier and a comparator which are not shown. The resistor outputs a voltage v that is varied by a thermal motion of electrons, in accordance with a temperature. The amplifier amplifies this voltage v, and outputs to the comparator. The comparator receives the amplified voltage v and a threshold V of a certain value. It outputs High if the voltage v is equal to or greater than the threshold V, and outputs Low if the voltage v is less than the threshold V.

If the threshold V is sufficiently high, the probability that the voltage v is equal to or greater than the threshold V becomes low, and an output of the comparator presents a shape of pulse. This pulse is outputted as the random pulse 111 by the random pulse generator 102. In the random pulse 111 generated by such thermal noise, a temporal interval $\tau\_$ between two pulses adjacent to each other is not based on a uniform distribution, and it is based on an exponential distribution.

The clock generator 103 outputs a clock signal 112 that is a pulse having a cycle. The counter 107 receives a random pulse 111 and the clock signal 112, and outputs a random number code 113. The counter 107, if receiving one pulse of the random pulse 111, starts counting a count number c, which is the number of the pulses of the clock signal 112, from 0 in a binary notation. The counter 107, if receiving a next pulse of the random pulse 111, stops the counting, and then outputs the lower 8 digits of the counted count number c as the random number code 113.

The random number code 113 coincides with a remainder when the number of the pulses of the clock signal 112 outputted at the temporal interval $\tau$ between the two pulses adjacent to each other in the random pulse 111 is divided by 256. That is, if the count numbers c are congruent with 256 as a modulus, the random number code 113 corresponding to them coincide with each other.

The random number holder 105 sequentially records the random number codes 113 generated by the time measuring unit 104, and suitably outputs the oldest code of the recorded random number codes 113, to an apparatus in which a random number generator 101 is installed.

FIG. 2 shows a frequency distribution of the thus-generated random number code 113. This frequency distribution indicates that the larger the random number code 113, the smaller the frequency, and the random number code 113 is not based on the uniform distribution. Moreover, this frequency distribution indicates that a variation (standard deviation) of frequencies of the random number code 113 is large. FIG. 3 shows an FFT result of the random number code 113. This FFT result indicates an absence of spectrum. The absence of the spectrum indicates that the random number code 113 has no cyclic property. It is desired to provide a random number generator for generating a random number based on the physical phenomenon, in which the random number is based on the uniform distribution.

SUMMARY OF THE INVENTION

The present invention is accomplished in view of the above mentioned problems. Therefore, an object of the present invention is to provide a random number generator generating a random number based on a uniform distribution without cyclic property or reproduction property.

Another object of the present invention is to provide a random number generator using a physical phenomenon and then generating a random number based on a uniform distribution.

Still another object of the present invention is to provide a random number generator generating a random number based on a plurality of random pulses in which a temporal interval between two pulses adjacent to each other is not based on a uniform distribution.

Still another object of the present invention is to provide a random number generator converting a random number, which is not based on a uniform distribution, into a random number based on the uniform distribution.

Still another object of the present invention is to provide a random number generator generating a random number in which a standard deviation of frequencies of each code is small.

In order to achieve an aspect of the present invention, a random number generator includes a random pulse generator (2) generating a plurality of random pulses (11); a scrambler (8) generating an initial value (14); and a counter (7) generating a random number code (13) based on the initial value (14) and a temporal interval ($\tau$) of the plurality of random pulses (11), and wherein the initial value (14) is varied, and the initial value (14) is not a fixed value. Such a random number code (13) is approximately based on a uniform distribution even if the temporal interval ($\tau$) is not based on the uniform distribution.

Preferably, an increase in a circuit size is reduced since the scrambler (8) generates the initial value (14) based on the random number code (13) previously generated by the counter (7). Moreover, preferably, the increase in the circuit size is reduced since the random number code (13) is represented by a binary notation of n digits (n=2, 3, 4, . . . ) and the scrambler (8) generates the initial value (14) by replacing the respective digits of the random number code (13) finally generated by the counter (7). N ! kinds of such scramblers (8) are manufactured.

The scrambler (8) generates the initial value (14) by replacing the higher i-th digit (i=1, 2, 3, . . . , n) of the random number code (13) with the higher (n−i+1)-th digit of the random number code (13). That is, the higher i-th of the random number code (13) coincides with the higher (n−i+1)-th digit of the initial value (14). Such a scrambler (8) is manufactured only by changing a wiring. Thus, this is preferable since the increase in the circuit size is reduced. Also, this is preferable since the relative relation between the random number code (13) and the initial value (14) is small.

A scrambler (8') has a table (9). The table (9) correlates the random number code (13) and the initial value (14) to each other. The scrambler (8') refers to the table (9), and generates the initial value (14) corresponding to the random number code (13) previously generated by the counter (7). N ! kinds of such tables (9) are manufactured assuming that a total number of the random number codes (13) is N.

It further includes a clock generator (3) generating a clock signal (12). Preferably, the counter (7) counts the count number (c) of the clock signal (12) in a period of the temporal interval ($\tau$) and outputs a remainder, in which a sum of the initial value (14) and the count number (c) is divided by a total number (N) of the random number code (13), as the random number code (13).

The random pulse generator (2) generates the random pulse (11) based on an event occurring at random. At this time, preferably, the random number code (13) has no reproduction property. Preferably, the random pulse generator (2) generates the random pulse (11) based on a thermal noise of a resistor. Preferably, the random pulse generator (2) generates the random pulse (11) based on a thermal noise of a diode. Preferably, the random pulse generator (2) generates the random pulse (11) based on a disintegration of a radioactive element.

Preferably, the random number generator according to the present invention is used for an encryption. Preferably, the random number generator according to the present invention is used for a simulation.

A random number generator according to the present invention is provided with: a random pulse generator (22) generating a plurality of random pulses (31); a first counter (27-1) generating a first code (33-1) based on a temporal interval ($\tau$) of the plurality of random pulses (31); a second counter (27-2) generating a second code (33-2) different from the first code (33-1) based on the temporal interval ($\tau$) of the plurality of random pulses (31); and a scrambler (28) generating a first random number code based on the first code (33-1), and generating a second random number code based on the second code (33-2), and then outputting a third random number code (34) in which the first random number code and the second random number code are alternately arranged. The first code (33-1) corresponds to the count number counted in the period of the temporal interval ($\tau$) of the plurality of random pulses (31), and the second code (33-2) corresponds to the count number counted in the opposite direction in the period of the temporal interval ($\tau$) of the plurality of random pulses (31). In this case, the counting in the opposite direction implies the subtraction. A probability distribution of such a third random number code (34) is preferable since there is no inclination in a frequency distribution of the third random number code (34).

Preferably, the first code (33-1) and the second code (33-2) are represented by the binary notation of n digits (n=2, 3, 4, . . . ), and the scrambler (28) generates the first random number code by replacing the higher i-th digit (i=1, 2, 3, . . . , n) of the first code (33-1) with the higher (n−i+1)-th digit of the first code (33-1), and generates the second random number code by replacing the higher j-th (j=1, 2, 3, . . . , n) digit of the second code (33-2) with the higher (n−j+1)-th digit of the second code (33-2).

A scrambler (8') has a table (9). The table (9) correlates the first code and the first random number code (13) to each other, and correlates the second code and the second random number code (13) to each other. Preferably, the scrambler (8') refers to the table (9), and generates the first random number code (13) corresponding to the first code, and refers to the table (9), and then generates the second random number code (13) corresponding to the second code.

A random number generating method according to the present invention includes the steps of: generating a plurality of random pulses (11); generating an initial value (14) that is varied and is not a fixed value; and generating a random number code (13) based on a temporal interval ($\tau$) of the plurality of random pulses (31) and the initial value (14). Such a random number code (13) is approximately based on a uniform distribution, even if the temporal interval ($\tau$) is not based on the uniform distribution.

Preferably, the initial value (14) is generated on the basis of the previously generated random number code (13). Preferably, the random number code (13) is represented by the binary notation of n digits (n=2, 3, 4, . . . ), and the initial value (14) is generated by replacing the respective digits of the finally generated random number code (13).

The initial value (14) is generated by replacing the higher i-th digit (i=1, 2, 3, . . . ) of the random number code (13) with the higher (n−i+1)-th digit of the random number code (13). Such an initial value (14) is preferable since the relative relation to the random number code (13) is small.

Preferably, a program for instructing a computer to execute the random number generating method according to the present invention includes: a step of generating a first random number (Step S1); a step of generating an initial value (14) that is varied and is not a fixed value (Step S4); and a step of generating a remainder, in which a sum of the first random number and the initial value (14) is divided by a predetermined value, as a second random number (Step S3).

Preferably, the initial value (14) is generated on the basis of the previously generated first random number. An algorism for generating a random number is typically large, and the initial value (14) is defined as the random number generated independently of the first random number. Accordingly, the random number code (13) can be generated at a high speed.

Preferably, the first random number is represented by the binary notation of n digits (n=2, 3, 4, . . . ), and the initial value (14) is generated by replacing the higher i-th digit (i=1, 2, 3, . . . ) of the random number code (13) with the higher (n−i+1)-th digit of the random number code (13).

DESCRIPTION OF THE PREFERRED EMBODIMENTS

Figure 1:
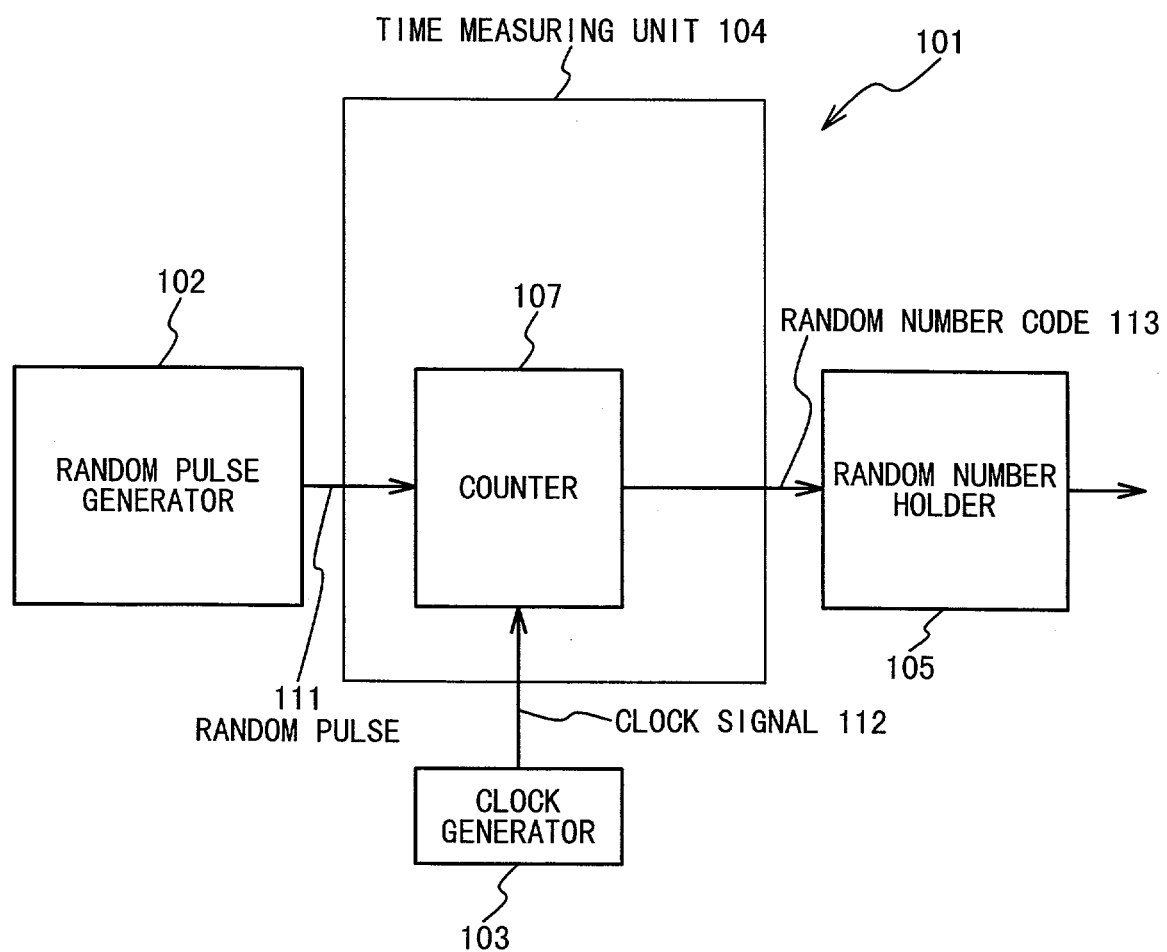
FIG. 1 is a block diagram showing an embodiment of a known random number generator.
Figure 2:
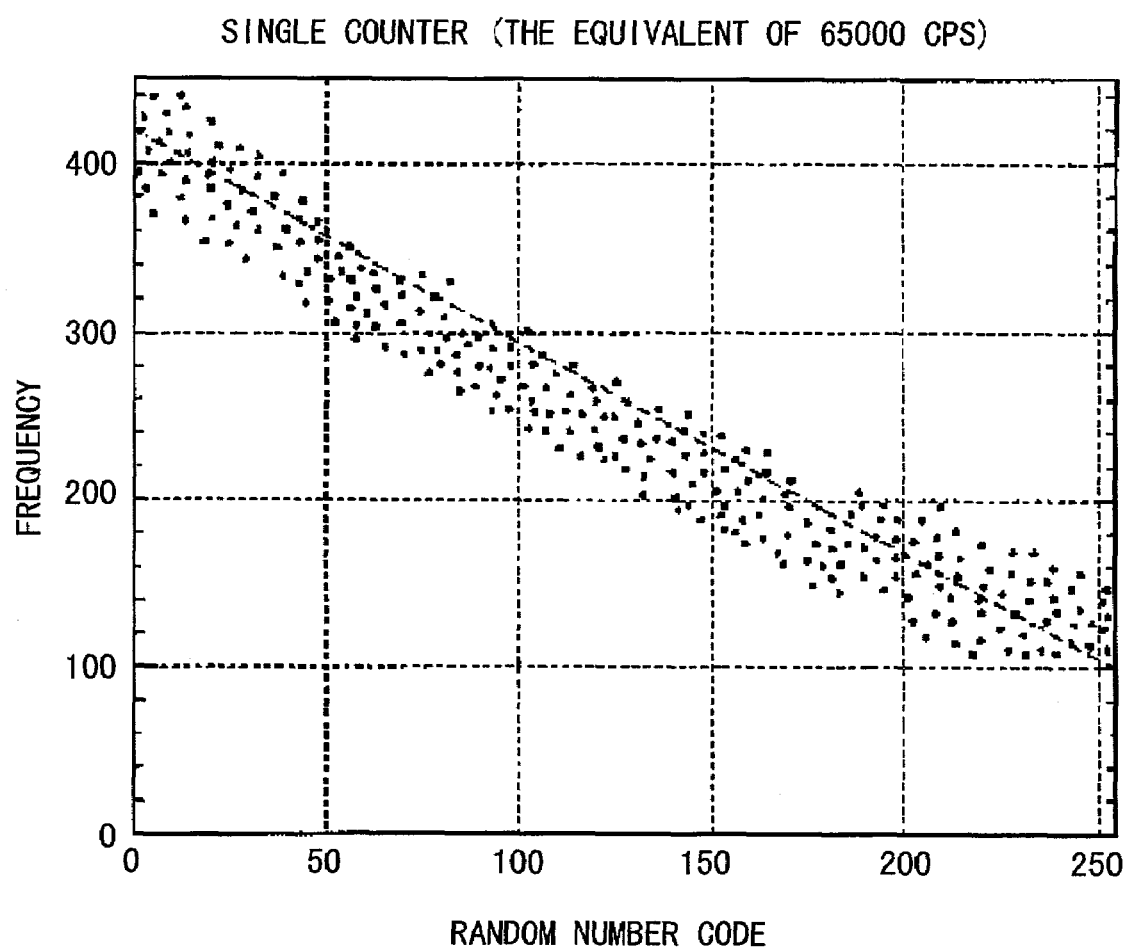
FIG. 2 is a graph showing a frequency distribution of a random number code.
Figure 3:
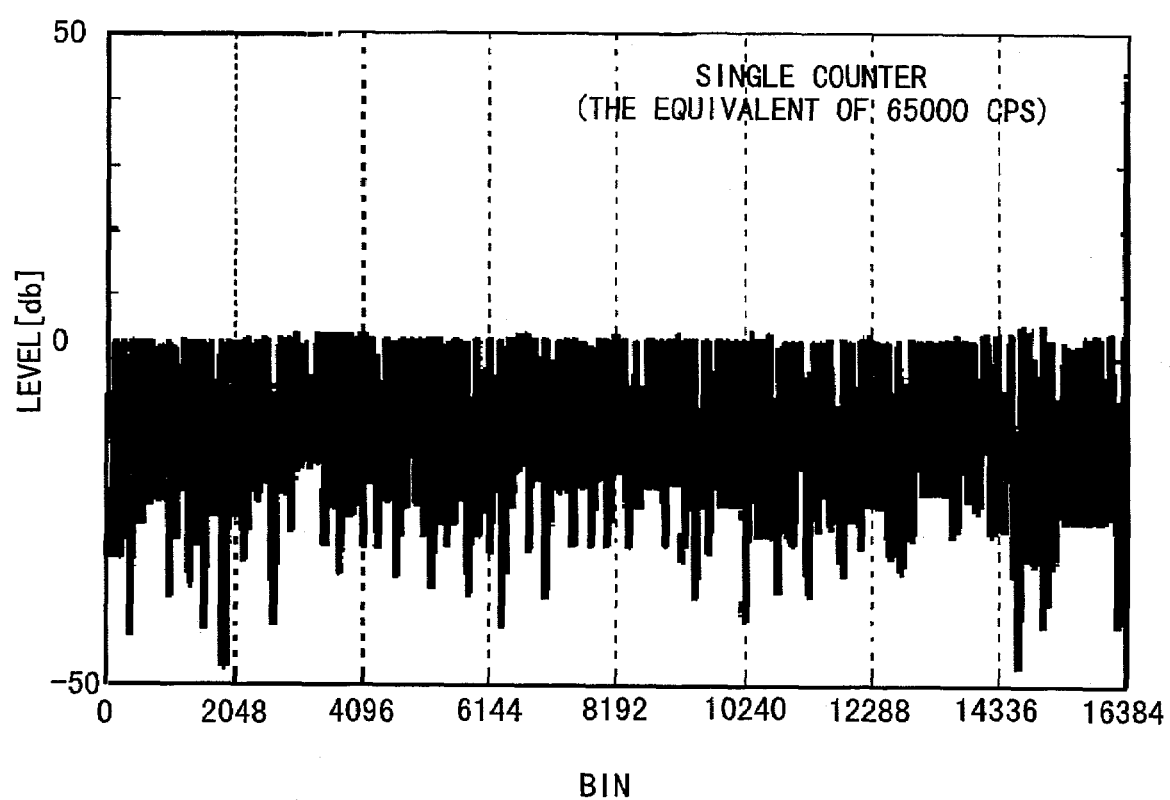
FIG. 3 is a graph showing an FFT result of a random number code.
Figure 4:
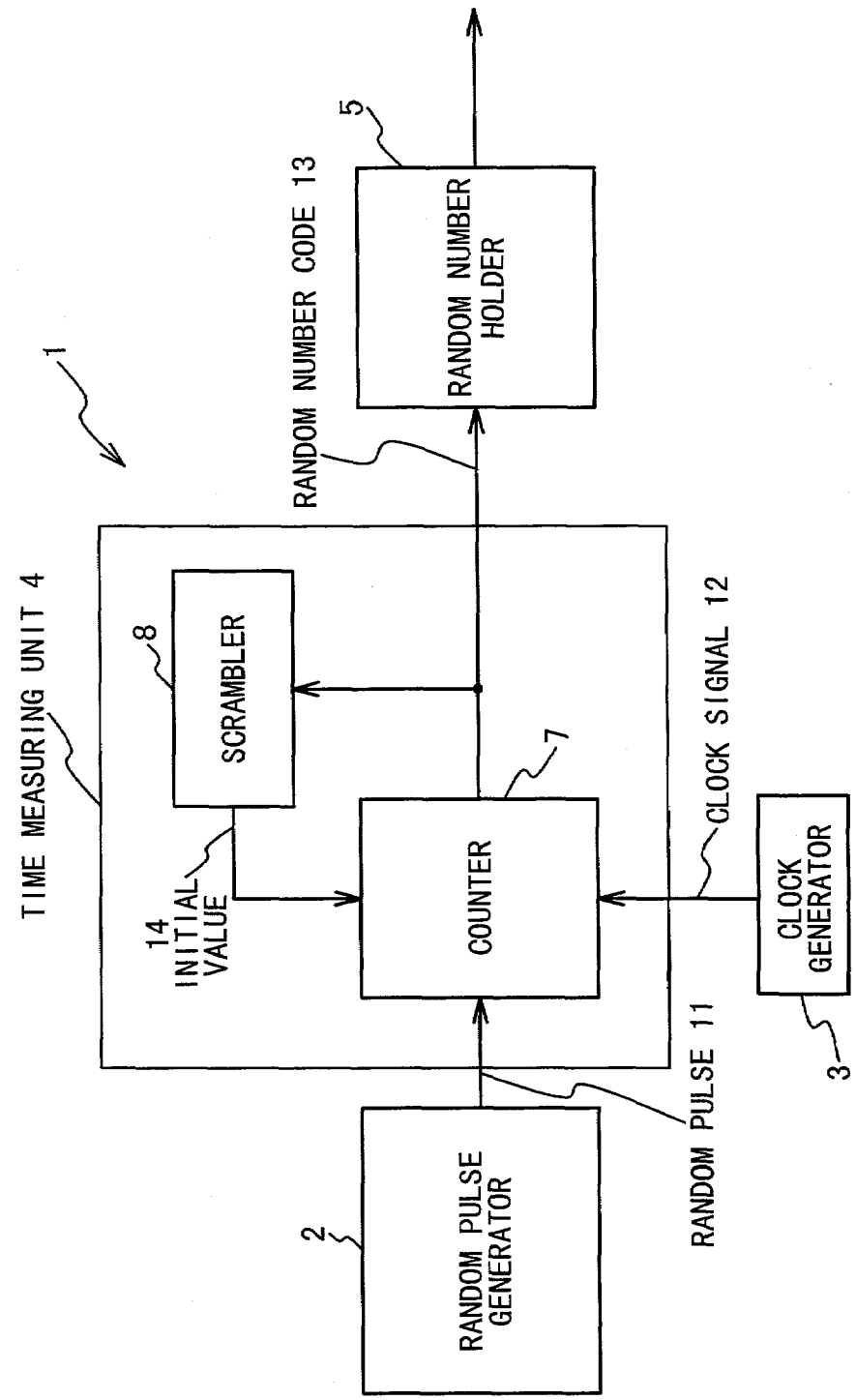
FIG. 4 is a block diagram showing an embodiment of a random number generator according to the present invention.

An embodiment of the present invention will be described below with reference to the attached drawings. As shown in FIG. 4, a random number generator 1 is provided with: a random pulse generator 2, a clock generator 3, a time measuring unit 4 and a random number holder 5, within one chip. The time measuring unit 4 has a counter 7 and a scrambler 8. The random pulse generator 2 is connected to the counter 7 of the time measuring unit 4. The clock generator 3 is connected to the counter 7 of the time measuring unit 4. The counter 7 is connected to the scrambler 8 and the random number holder 5. The scrambler 8 is connected to the counter 7.

The random pulse generator 2 outputs a random pulse 11 that is a pulse having no cyclic property. The random pulse generator 2 has a resistor, an amplifier and a comparator which are not shown. The resistor outputs a voltage v that is varied by a thermal motion of electrons, on the basis of a temperature. The amplifier amplifies this voltage v, and outputs to the comparator. The comparator receives the amplified voltage v and a threshold V of a certain value. It outputs High if the voltage v is equal to or greater than the threshold V, and outputs Low if the voltage v is less than the threshold V. Such a random pulse generator 2 is well known.

If the threshold V is sufficiently high, the probability that the voltage v is equal to or greater than the threshold V becomes low, and an output of the comparator presents a shape of pulse. This pulse is outputted as the random pulse 11 by the random pulse generator 2. In the random pulse 11 generated by such thermal noise, a temporal interval $\tau$ ($\tau \geq 0$) between two pulses adjacent to each other is not based on a uniform distribution, and it is based on an exponential distribution.

By the way, the random pulse generator can include a diode instead of the resistor. Even in the thus-generated random pulse 11, the temporal interval $\tau$ between the two pulses adjacent to each other is not typically based on the uniform distribution.

The clock generator 3 outputs a clock signal 12 that is a pulse having a cycle. The counter 7 receives the random pulse 11 and the clock signal 12 and an initial value 14 outputted by the scrambler 8, and outputs a random number code 13. The counter 7, if receiving one pulse of the random pulse 11, obtains the initial value 14 from the scrambler 8. The counter 7 adds 1 to the initial value 14, for each reception of the pulse of the clock signal 12. If the added result becomes 256, it is reset to 0. Again for each reception of the pulse of the clock signal 12, 1 is added. The counter 7, if receiving a next pulse of the random pulse 11, outputs the added result as the random number code 13. That is, at this time, the random number code 13 is the sum of the initial value 14 and a count number c that is the number of the pulses of the clock signal 12 generated in the period of the temporal interval $\tau$ between the two pulses adjacent to each other in the random pulse 11.

The random number code 13 is a remainder when the sum of the initial value 14 and the count number c is divided by 256. That is, the two random number codes 13 respectively corresponding to the two sums congruent with 256 as a modulus coincide with each other.

The scrambler 8 generates the initial value 14 based on the random number code 13, and outputs to the counter 7. That is, the scrambler 8 replaces a first bit of the random number code 13 with an eighth bit, replaces a second bit with a seventh bit, replaces a third bit with a sixth bit, and replaces a fourth bit with a fifth bit, and then generates the initial value 14. Such a scrambler 8 is constituted only by changing a wiring. Thus, the circuit size is not substantially increased.

By the way, the replacement executed by the scrambler 8 can be done in any kind, if the random number code 13 and the initial value 14 correspond to each other in a one-to-one relationship. At this time, 8 ! (=40320) kinds of replacements are possible. All of those replacements are not always effective. The replacement in which a relative relation occurs before and after it is not desirable.

The random number holder 5 sequentially records the random number codes 13 generated by the time measuring unit 4, and suitably outputs the oldest code of the recorded random number codes 13, to an apparatus in which the random number generator 1 is installed, and then deletes the code.

Figure 5:
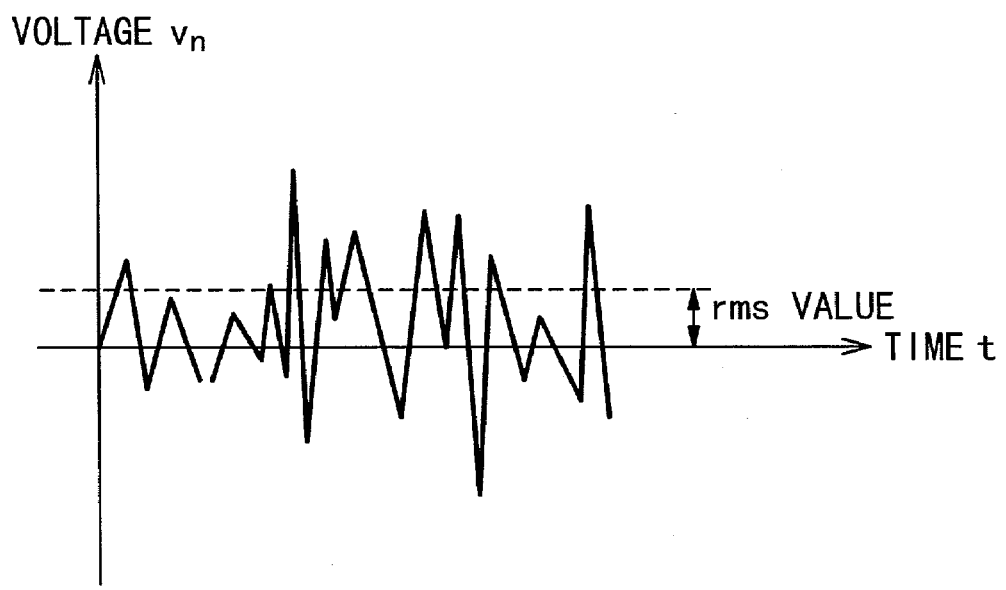
FIG. 5 is a graph showing a voltage caused by a thermal noise of a resistor.

Typically, the thermal motion (Brownian motion) is induced in the resistor, on the basis of a temperature of the resistor. In the resistor, a voltage v varying at random is induced by the thermal motion, as shown in FIG. 5. By using a Boltzmann constant $k_B$ (J/K), an absolute temperature T (K), a resistance R (Ω) and a band width $\Delta F$ (Hz), a root mean square $<v_n^2>$ of the voltage $v_n$(V) is given by the equation (1):

$$(V_n^2) = 4k_B T R \Delta F \tag{1}$$

Figure 6:
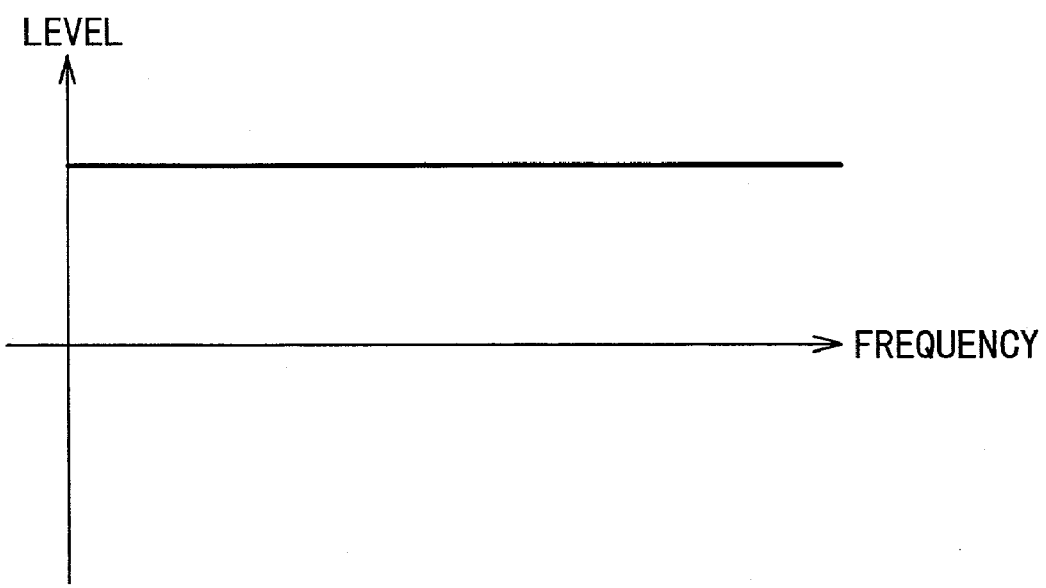
FIG. 6 is a graph showing an FFT result of a voltage caused by a thermal noise of a resistor.

If a Fourier transform is performed on the voltage $v_n$, its spectrum becomes flat as shown in FIG. 6. This implies that the voltage $v_n$ varied by the thermal motion presents a white noise.

Figure 7:
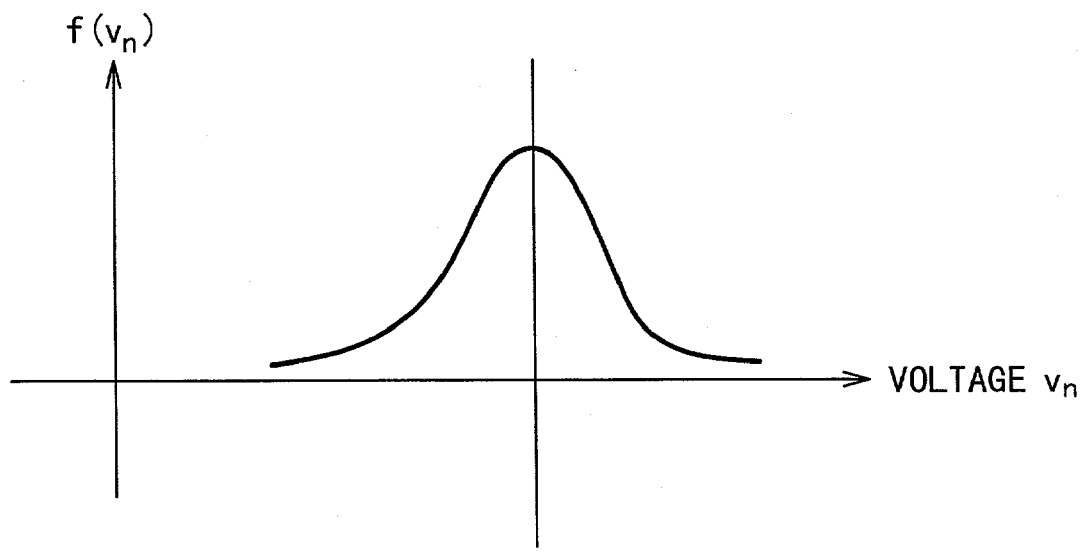
FIG. 7 is a graph showing a probable density function of a voltage of a thermal noise of a resistor.

A probable density function $f(v_n)$ of a voltage $v_n$ at each moment is based on a Gauss distribution, as shown in FIG. 7. Its standard deviation (σ) is given by the equation (2):

$$\sigma = \sqrt{(V_n^2)} = \sqrt{4k_b T R \Delta F} \tag{2}$$

Figure 8:
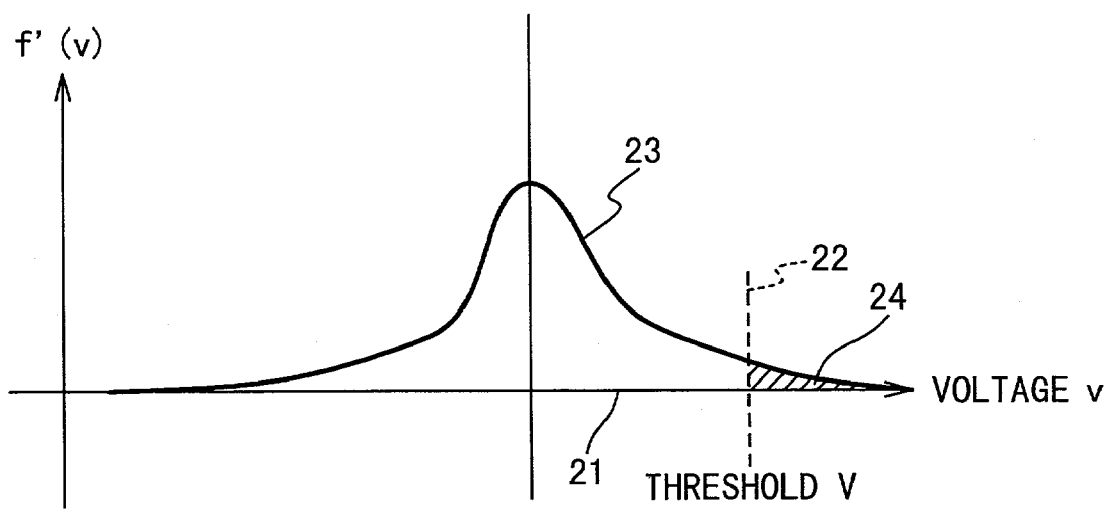
FIG. 8 is a graph showing a probable density function of a voltage after an amplification caused by a thermal noise of a resistor.

The random pulse generator 2 in the random number generator 1 according to the present invention uses the voltage v after the amplification of the voltage $v_n$, as a signal source of the random pulse 11. In the amplifying process, a band width is limited by a circuit. Thus, a probable density function f'(v) of the voltage v is different from the probable density function $f(v_n)$ of the voltage $v_n$. However, the situation that the voltage v is varied at random remains the same. Hence, the voltage v is approximately based on the Gauss distribution as shown in FIG. 8.

If the probable density function f'(v) of the voltage v is suitably given, a probability p of an event that a voltage v at a certain moment is equal to or higher than a threshold V of a certain voltage is determined by an area 24 encircled by a v-axis 21, a straight line 22 represented by v=V and a curved line 23 represented by a function f'(v). If the probability distribution of the voltage v is accurately determined, this probability can be calculated. It is difficult to determine the probability distribution from a calculation after a complex band width limitation is imposed on the amplifying process. However, the fact that the probability p of the event in which the voltage v exceeds the threshold V is lower as the threshold V becomes higher and it is higher as the threshold V becomes lower is not changed.

If the threshold V is set to be sufficiently high, the probability p becomes very low. At this time, an output of the random pulse generator 2 presents a shape of pulse. Moreover, if the output of the random pulse generator 2 is observed n times (n=1, 2, 3, . . . ) and the observance number n is very large, the observation number k (k=1, 2, 3, . . . ; k≦n) of the pulses in the n observations is based on a Poisson distribution. By using a constant λ (where λ=np), a probability P that the observation number k (X=k) of the pulses is a probability variable X is given by the equation (3):

$$P(X=k) = \frac{\lambda^k}{k!} e^{-\lambda} \tag{3}$$

An expectation value E(X) of the observation number k of the pulses in the n observations is given by the equation (4):

$$E(X) = \lambda \tag{4}$$

That is, on the average, the λ pulses are observed in the n observations.

If the n observations are carried out for each unit time (one second), (n×T) observations are done within a period of an observation time T (second). At this time, by using the constant λ (where λ'=nTp=λT), a probability P' (Y=k) in which the observation number k of the pulses within the observation time T is a probability variable Y is given by the equation (5):

$$P'(Y=k) = \frac{(\lambda')^k}{k!} e^{-\lambda'} = \frac{(\lambda T)^k}{k!} e^{-\lambda T} \tag{5}$$

An expectation value E(Y) of the observation time k of the pulses within the observation time T is given by the equation (6):

$$E(Y) = \lambda T \tag{6}$$

A probability P' (Y=0) that the pulse is not observed within the observation time T is given by the equation (7):

$$P'(Y=0) = e^{-\lambda T} \tag{7}$$

By the way, a probability G that the observation time T when the pulse is not observed is a probability variable Z (Z≧T) is a probability of an event that the temporal interval τ between the two pulses adjacent to each other in the random pulse 11 is longer than the observation time T, and it coincides with the probability P' (Y=0). Then, the equation (8) is established:

$$G(Z \geq T) = P'(Y=0) \tag{8}$$

Under the assumption of a probable density function g(τ) of the temporal interval τ between the two pulses adjacent to each other, the probability G (Z≧T) is given by the equation (9):

$$G(Z \geq T) = \int_T^\infty g(\tau) d\tau \tag{9}$$

A probability G (0≦Z<T) of an event that the temporal interval τ of the complementary event is less than the observation time T is given by the equation (10):

$$G(0 \leq Z < T) = \int_0^T g(\tau) d\tau \tag{10}$$

Moreover, the probability G (0≦Z<T) coincides with the probability P' (Y>0) of the event that the pulse is observed within the observation time T, and the equation (11) is established:

$$G(0 \leq Z < T) = P'(Y>0) \tag{11}$$

Moreover, the event that the pulse is observed within the observation time T is the complementary event of the event that the pulse is not observed within the observation time T. Thus, the equation (12) is established:

$$P'(Y>0) = 1 - P'(Y=0) = 1 - e^{-\lambda T} \tag{12}$$

From the equations (10), (11) and (12), the equation (13) is introduced:

$$\int_0^T g(\tau) d\tau = 1 - e^{-\lambda T} \tag{13}$$

By differentiating the sides of the equation (13) with respect to the observation time T, the equation (14) is introduced:

$$g(\tau) = \lambda e^{-\lambda \tau} \tag{14}$$

Figure 9:
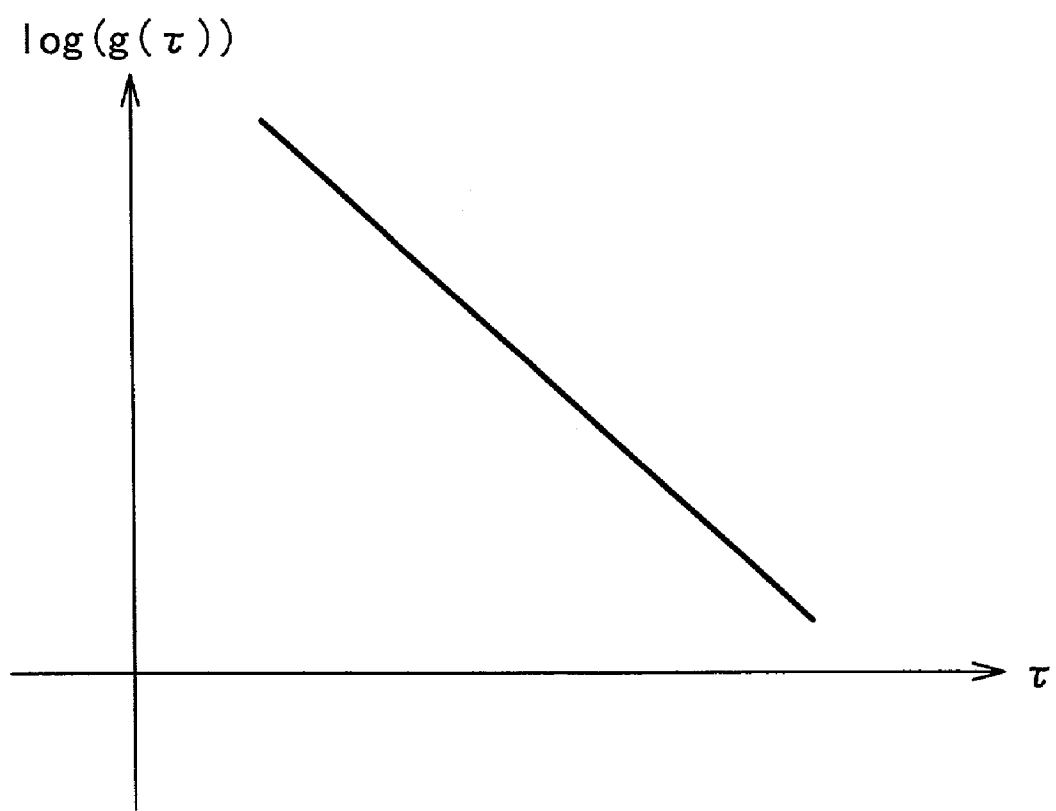
FIG. 9 is a graph showing a probable density function of a temporal interval between random pulses adjacent to each other.

The equation (14) represents the probable density function g(τ) of the temporal interval τ, and it indicates that the temporal interval τ is based on the exponential distribution, as shown in FIG. 9.

Since the temporal interval τ is defined to be τ≧0, the expectation value E(τ) of the temporal interval τ is given by the equation (15):

$$E(\tau) = \int_0^\infty \tau g(\tau) d\tau = \int_0^\infty \lambda \tau e^{-\lambda \tau} d\tau = \frac{1}{\lambda} \quad (15)$$

The equation (15) indicates that the average of the temporal intervals τ is 1/λ and that on the average, the λ pulses are observed for each unit time (one second). It matches with the equation (6).

If the temporal interval τ between the two pulses adjacent to each other is measured on the basis of the count number c implying the number of the pulses in the clock signal 12 having a period Tc (second), a probability Q (C=c) in which the count number c counted in the period of the temporal interval τ is a probability variable C is given by the equation (16):

$$Q(C=c) = \int_{cT_c}^{(c+1)T_c} g(\tau) d\tau = -\lambda e^{-\lambda c T_c}(e^{-\lambda T_c} - 1) \quad (16)$$

Figure 10:
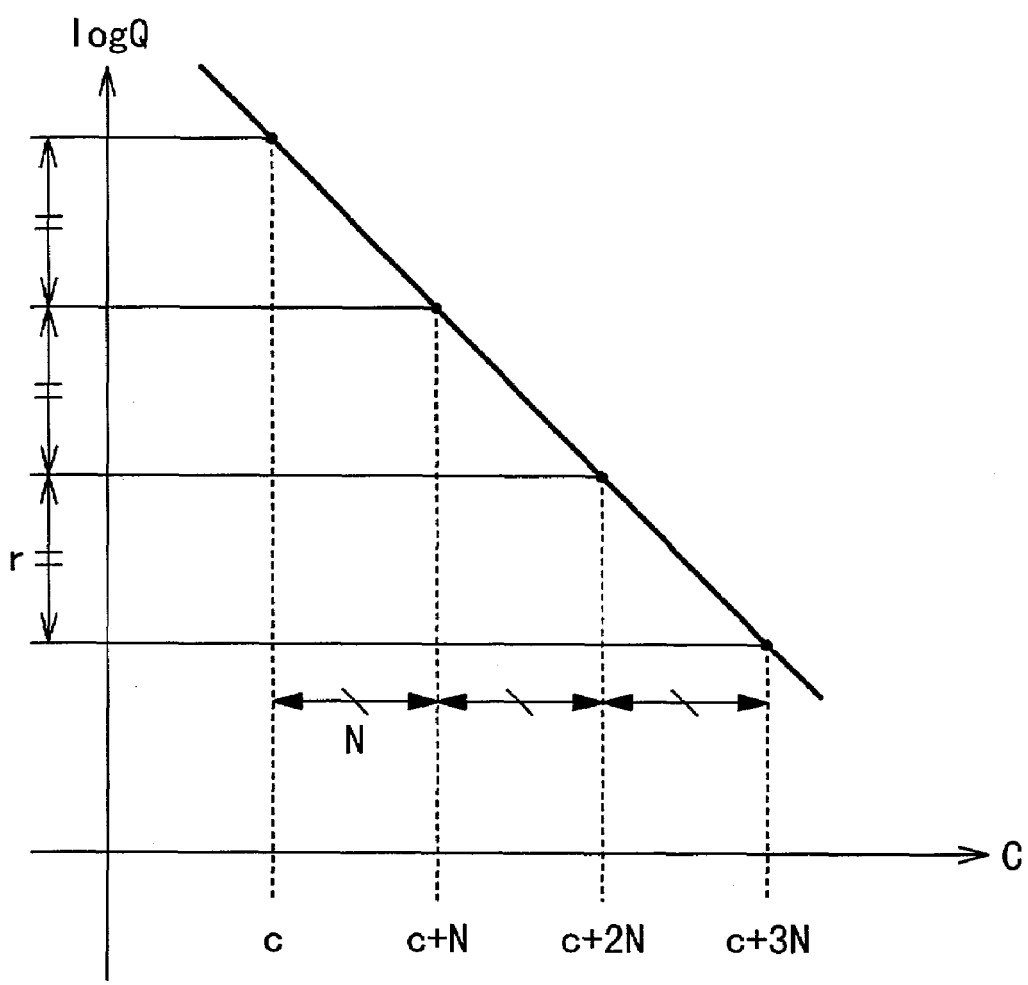
FIG. 10 is a graph showing a probability distribution of a count number.

FIG. 10 shows the probability distribution of the count number c. The occurrence of the count number c is based on the exponential distribution.

Such as the random number generator 101 in the conventional technique, when the remainder after the count number c is divided by the total number N of the random number codes 113 is correlated to the random number codes 113, the random number codes 113 generated correspondingly to the count number c coincide with the random number codes 113 generated correspondingly to the count number (c+N). By using the equation (16), a ratio r of the probability of the event of the generation of the count number c to the probability of the event of the count number (c+N) is given by the equation (17):

$$r = \frac{Q(C=(c+N))}{Q(C=c)} = \frac{-\lambda e^{-\lambda(c+N)T_c}(e^{-\lambda T_c} - 1)}{-\lambda e^{-\lambda c T_c}(e^{-\lambda T_c} - 1)} = e^{-\lambda N T_c} \quad (17)$$

The equation (17) indicates that the ratio r is a constant.

A probability $Q_A$ of an occurrence of a count number $c_A$ ($C_A$<256), which is the minimum value of a count number c corresponding to a code $W_A$, is given by the equation (18):

$$Q_A = Q(C=c_A) = -\lambda e^{-\lambda c_A T_c}(e^{-\lambda T_c} - 1) \quad (18)$$

Moreover, a probability R ($W=w_A$) of the event of the occurrence of the code $w_A$ as the random number code 113 is given by the equation (19):

$$R(W=w_A) = Q_A + Q_A r + Q_A r^2 + Q_A r^3 + \ldots + Q_A r^i + \ldots = \frac{Q_A}{1-r} \quad (19)$$

Similarly, a probability $Q_B$ of an occurrence of a count number $c_B$ ($c_B<c_A$), which is the minimum value of a count number c corresponding to a code $w_B$ different from the code $w_A$, is given by the equation (20):

$$Q_B = Q(C=c_B) = -\lambda e^{-\lambda c_B T_c}(e^{-\lambda T_c} - 1) \quad (20)$$

Moreover, a probability R ($W=w_B$) of the event of the occurrence of the code WB as the random number code 113 is given by the equation (21):

$$R(W=w_B) = Q_B + Q_B r + Q_B r^2 + Q_B r^3 + \ldots + Q_B r^i + \ldots = \frac{Q_B}{1-r} \quad (21)$$

A ratio s of the probability R ($W=w_A$) to the probability R ($W=w_B$) is given by the equation (22):

$$s = \frac{R(W=w_A)}{R(W=w_B)} = \frac{\frac{Q_A}{1-r}}{\frac{Q_B}{1-r}} = \frac{Q_A}{Q_B} = \frac{-\lambda e^{-\lambda c_A T_c}(e^{-\lambda T_c} - 1)}{-\lambda e^{-\lambda c_B T_c}(e^{-\lambda T_c} - 1)} = e^{-\lambda(c_A - c_B)T_c} \quad (22)$$

The equation (22) indicates that the probabilities of the occurrences of two different random number codes 113 are different.

Figure 11:
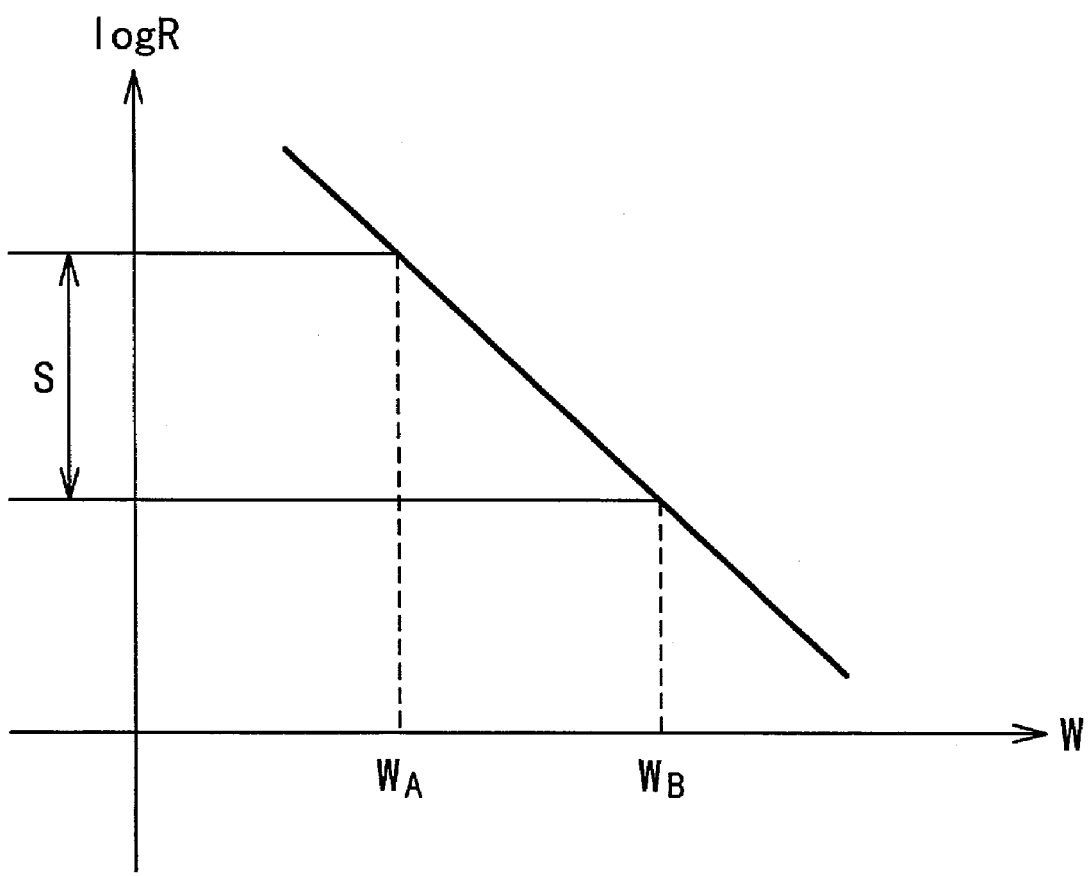
FIG. 11 is a graph showing a probability distribution of a random number code.

FIG. 11 shows the probability distribution of the random number code 113. This probability distribution indicates that the probability R is based on the exponential distribution, and indicates that the larger the random number code 113, the lower the probability R. A value of an equation ($c_A - c_B$) is given by the equation (23):

$$0 < C_A - C_B < N \quad (23)$$

By using a frequency f (Hz) of the clock signal 12, a lower limit s' of the ratio s is given by the equation (24):

$$S' = e^{-\lambda N T_c} = e^{-\frac{\lambda N}{f}} \quad (24)$$

A value of the lower limit s' indicates that as it is closer to 1, the uniformity of the random number codes 113 is larger. The equation (24) indicates that the random number code 113 is not uniform, and indicates that as the value of the constant λ is lower, the total number N of the random number codes 113 is smaller and the frequency f of the clock signal 12 is higher, the uniformity of the random number code 113 is larger. The value of the constant λ can be reduced by increasing the threshold V.

The random number generator 101 in the conventional example limits the constant λ, the total number N of the random number codes 13 and the frequency f of the clock signal 12 to certain ranges, and uses them. For example, if the constant λ is λ=100 (times/second), the total number N of the random number codes 113 is N=256, and the frequency f of the clock signal 12 is f=13 (MHz)=13×10$^6$ (Hz), the lower limit s' is s'≈0.998. Even under this condition, it can be sufficiently used depending on an application.

Although the value of the constant λ can be controlled on the basis of the threshold V, the probable density function f(v) of the voltage v can not be accurately grasped. Thus, it can not be accurately controlled. Moreover, since the resistor is a component of an analog circuit, the amount of the thermal noise can not be kept at a predetermined value because of a temperature and a manufacturing deviation. The threshold V is also changed depending on a standard deviation. Hence, there may be a case that the uniform random number code can not be generated.

The random number code 13 according to this embodiment is generated on the basis of the sum of the count number c and the varied initial value 14. Thus, the count number c does not correspond to the random number code 13, and the random number code 13 is based on the uniform distribution. Moreover, the value in which a bit inversion is performed on the random number code 13 is used for the initial value 14 to generate a next random number code. Hence, the relative relation does not occur in the random number code 13.

Figure 12:
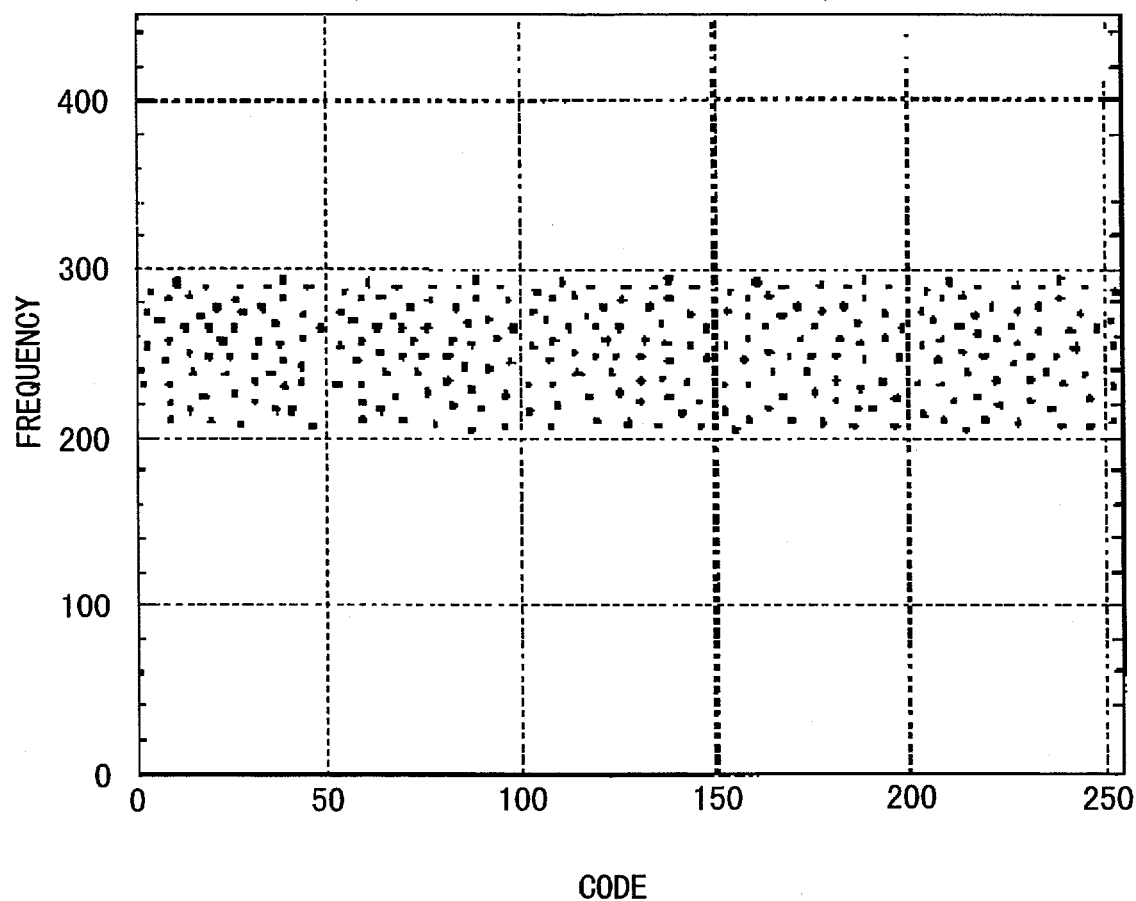
FIG. 12 is a graph showing a frequency distribution of a random number code.

FIG. 12 shows the frequency distribution of the random number code 13 generated by the random number generator according to the present invention. This frequency distribution indicates that there is no inclination in the frequency distribution of the random number code 13, and it indicates that the variation (standard deviation) of the frequency of the random number code 13 is small. That is, this frequency distribution indicates that the random number code 13 is approximately based on the uniform distribution.

Figure 13:
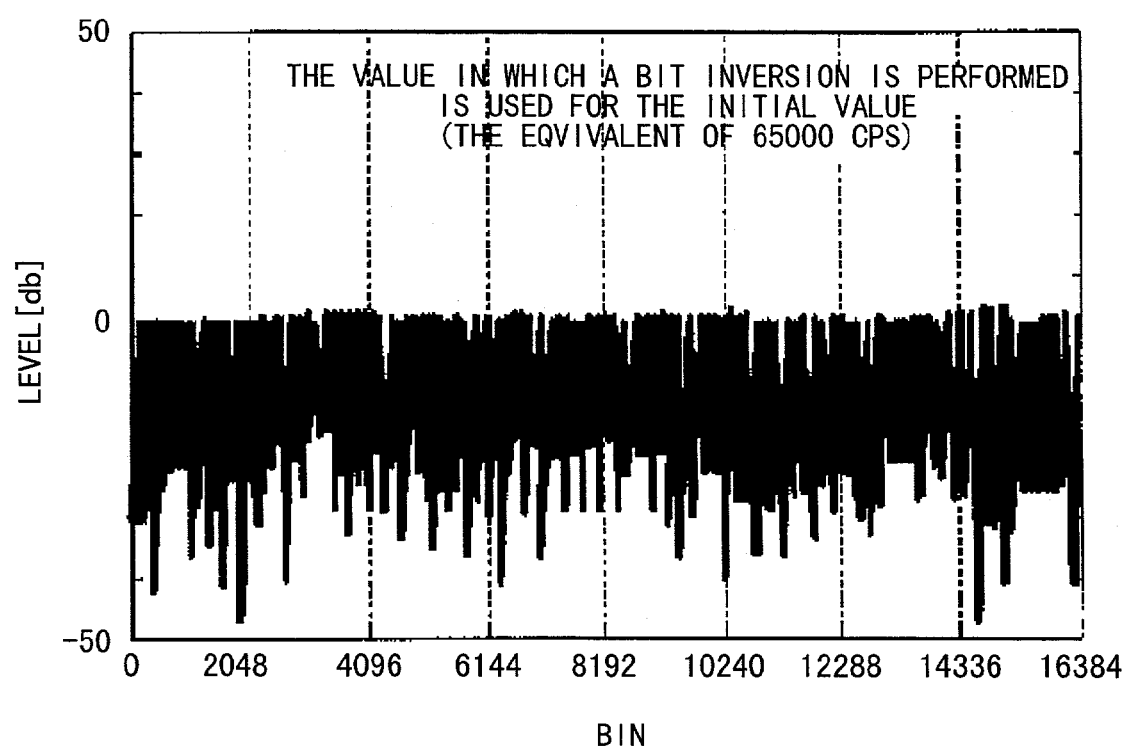
FIG. 13 is a graph showing an FFT result of a random number code.
Figure 14:
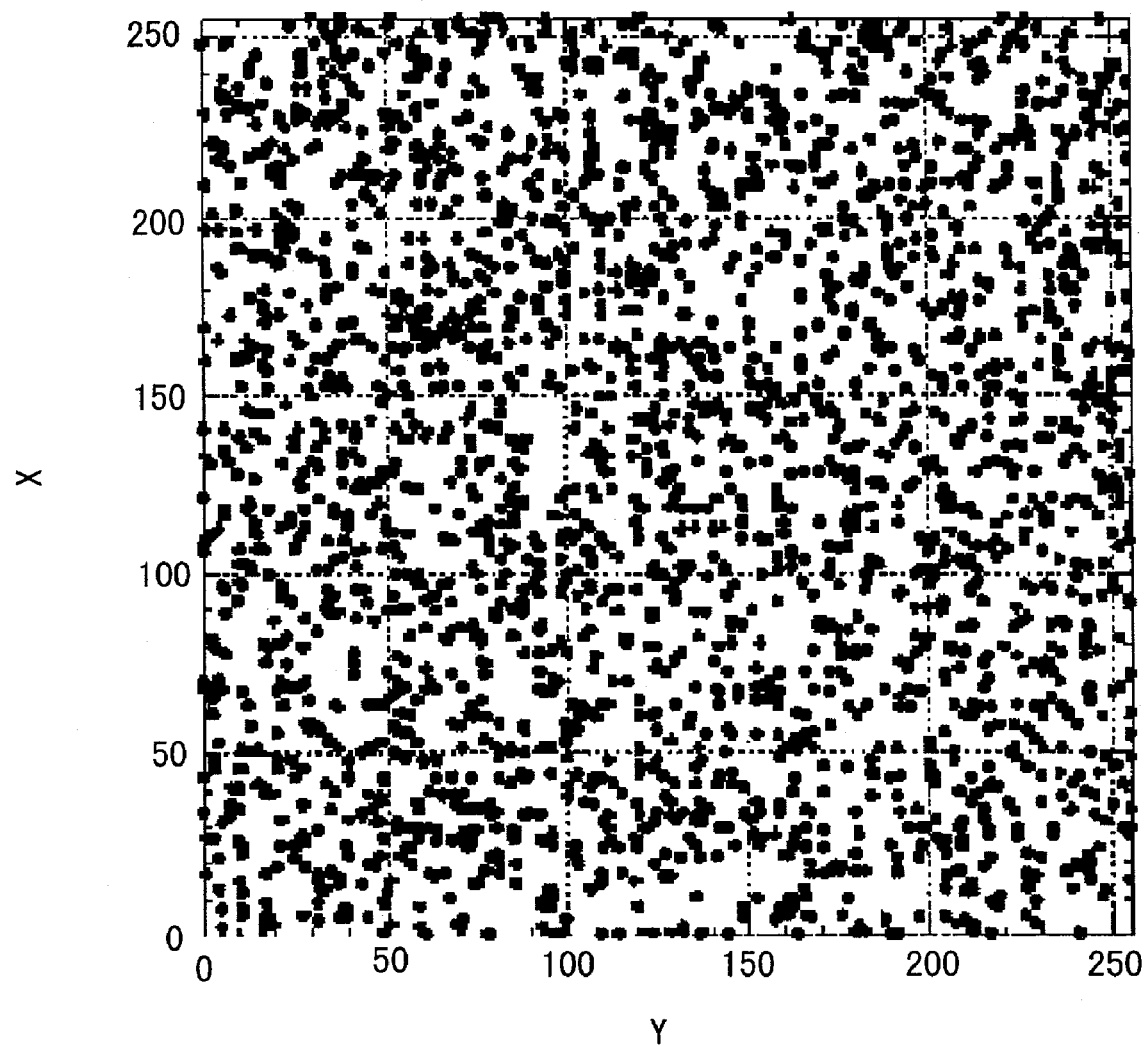
FIG. 14 is a graph showing a relative relation between random number codes adjacent to each other.

FIG. 13 shows the FFT result of the random number code 13. This FFT result indicates the absence of spectrum. The absence of the spectrum implies that there is no cyclic property in the random number code 13. FIG. 14 shows an X-Y plot of the codes adjacent to each other in the random number code 13. This X-Y plot indicates that it does not have a pattern having any structure and that there is no relative relation in the codes adjacent to each other.

The random number generator 1 is used in the application needing the random number that does not present the reproduction property and has the uniformity. For example, it is used for the authentication of a person or the encryption of data. At this time, it is possible to improve the security and the self-detection of illegal usage.

By the way, the random pulse generator 2 used in the random number generator 1 according to the present invention can generate the random pulse 11 not only depending on the thermal noise of the resistor but also depending on another physical phenomenon occurring at random.

Another embodiment of the random pulse generator has a radioactive ray source for emitting a radioactive ray, a PIN diode for detecting the radioactive ray, and an amplifier. As the radioactive ray source, $^{241}$Am, $^{244}$Cm and $^{208}$Po are exemplified. The PIN diode converts the radioactive ray emitted from the radioactive ray source into a current. The amplifier converts the current outputted by the PIN diode into a pulse of a voltage, and outputs as a random pulse. Such a random pulse generator is well known. Even in the case of the thus-generated random pulse, typically, the temporal interval τ between the two pulses adjacent to each other is not based on the uniform distribution.

Figure 15:
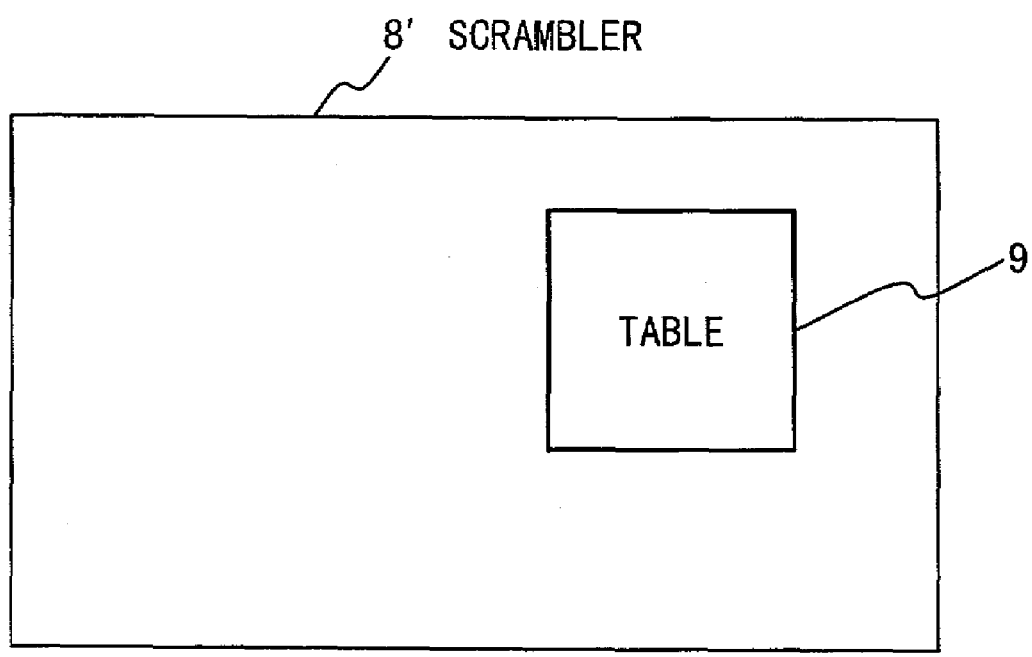
FIG. 15 is a block diagram showing another embodiment of a scrambler.

FIG. 15 shows another embodiment of the scrambler 8. Its scrambler 8' has a table 9. The table 9 correlates the random number code 13 to the initial value 14, in a one-to-one relationship. If the total number N of the random number codes 13 is 256, 256 ! kinds of tables 9 can be generated. By the way, all of the 256 ! kinds of the tables 9 are not always effective. The table 9 in which the relative relation occurs before and after the conversion is not desirable. The scrambler 8, when receiving the random number code 13, refers to the table 9, and then outputs the initial value 14 corresponding to the input random number code 13, to the counter 7.

Such a scrambler 8' can cancel out the relative relation in the random number code 13 by properly generating the table 9, if the relative relation occurs in the count numbers c adjacent to each other. The scrambler 8' has the circuit size larger than that of the scrambler 8 according to the previous embodiment. If the increase in the circuit size is not important, this table 9 is effective in canceling out the relative relation in the random number code 13.

Figure 16:
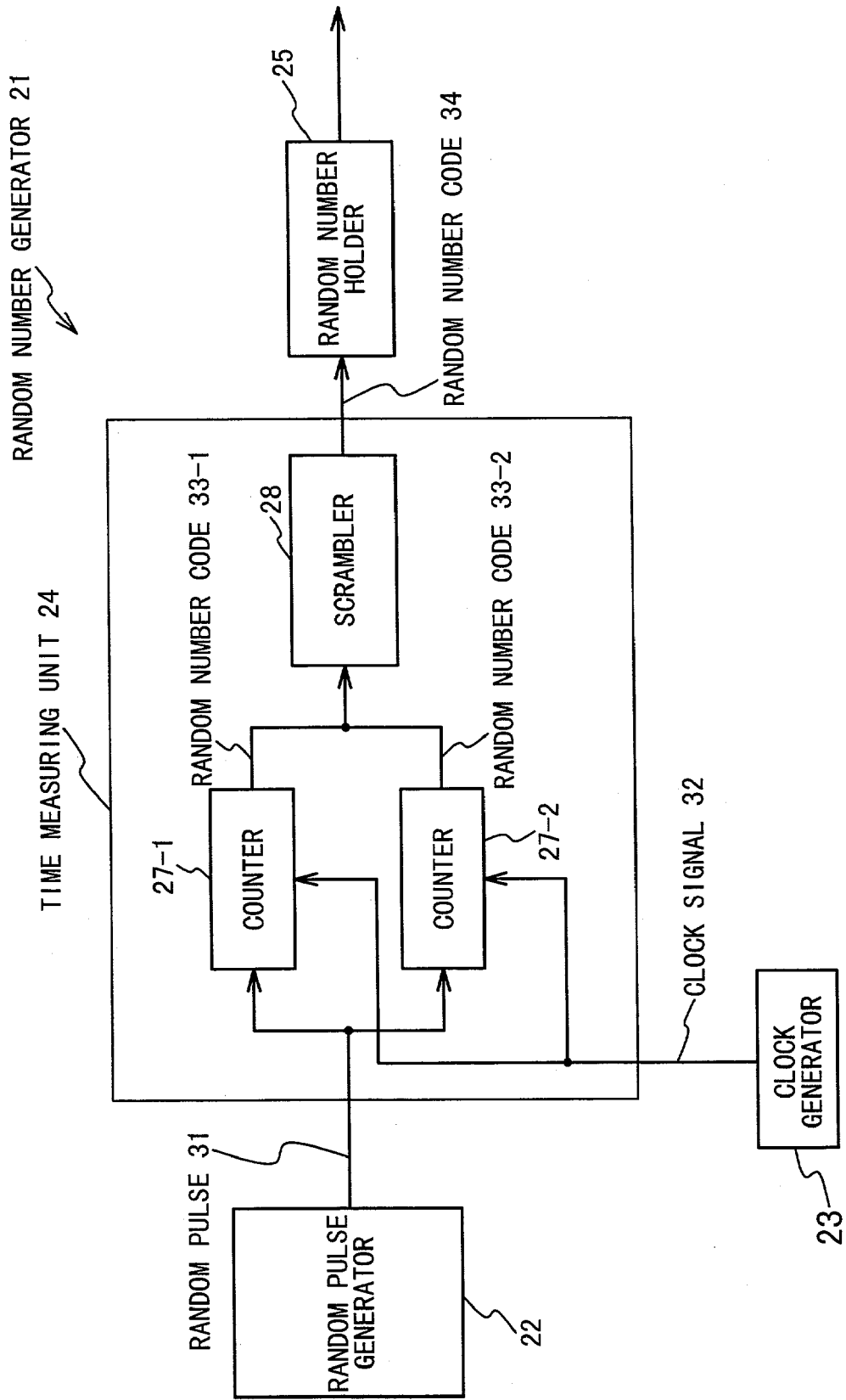
FIG. 16 is a block diagram showing another embodiment of a random number generator according to the present invention.

FIG. 16 shows another embodiment of the random number generator according to the present invention. Its random number generator 21 includes a random pulse generator 22, a clock generator 23, a time measuring unit 24 and a random number holder 25. The time measuring unit 24 has a counter 27-1, a counter 27-2 and a scrambler 28. The random pulse generator 22 is connected to the counter 27-1 and the counter 27-2 of the time measuring unit 24. The clock generator 23 is connected to the counter 27-1 and the counter 27-2 of the time measuring unit 24. The counter 27-1 is connected to the scrambler 28. The counter 27-2 is connected to the scrambler 28. The scrambler 28 is connected to the random number holder 25.

The random pulse generator 22 outputs a random pulse 31 that is a pulse having no cyclic property. The clock generator 23 outputs a clock signal 32 having a cyclic property.

The counter 27-1 receives the random pulse 31 and the clock signal 32, and outputs a random number code 33-1. The counter 27-1, if receiving one pulse of the random pulse 31, starts counting the count number c, which is the number of the pulses in the clock signal 32, from 0 in the binary notation. The counter 27-1, if receiving a next pulse of the random pulse 31, stops the counting, and then outputs the lower 8 bits of the counted count number c as the random number code 33-1.

The counter 27-2 receives the random pulse 31 and the clock signal 32, and outputs the random number code 33-2. The counter 27-2, if receiving one pulse of the random pulse 31, starts counting the count number c, which is the number of the pulses of the clock signal 32, from 0 in the opposite direction in the binary notation. That is, each time the pulse of the clock signal 32 is inputted to the counter 27-2, 1 is subtracted from the count number c. In this subtraction, a carrying down operation is executed without any subtraction from the digits of the lower ninth digit or more. Such a subtraction causes the count number c to be always positive. The counter 27-2, if receiving a next pulse of the random pulse 31, stops the counting, and then outputs the lower 8 bits of the counted count number c as the random number code 33-2.

The scrambler 28 alternately repeats two operations. One operation generates a random number code 34 on the basis of the random number code 33-1, and outputs to the random number holder 25. That is, the scrambler 28 replaces a first bit of the random number code 33-1 with an eighth bit, replaces a second bit with a seventh bit, replaces a third bit with a sixth bit, and replaces a fourth bit with a fifth bit, and then generates a random number code 35. The scrambler 28 outputs the generated random number code 35 to the random number holder 25.

The other operation generates a random number code 34 on the basis of the random number code 33-2, and outputs to the random number holder 25. That is, the scrambler 28 replaces a first bit of the random number code 33-2 with an eighth bit, replaces a second bit with a seventh bit, replaces a third bit with a sixth bit, and replaces a fourth bit with a fifth bit, and then generates a random number code 35. The scrambler 28 outputs the generated random number code 35 to the random number holder 25.

The random number holder 25 sequentially records the random number codes 33-1 generated by the time measuring unit 24, and suitably outputs the oldest code of the recorded random number codes 33-1, to the apparatus in which the random number generator 1 is installed.

Figure 17:
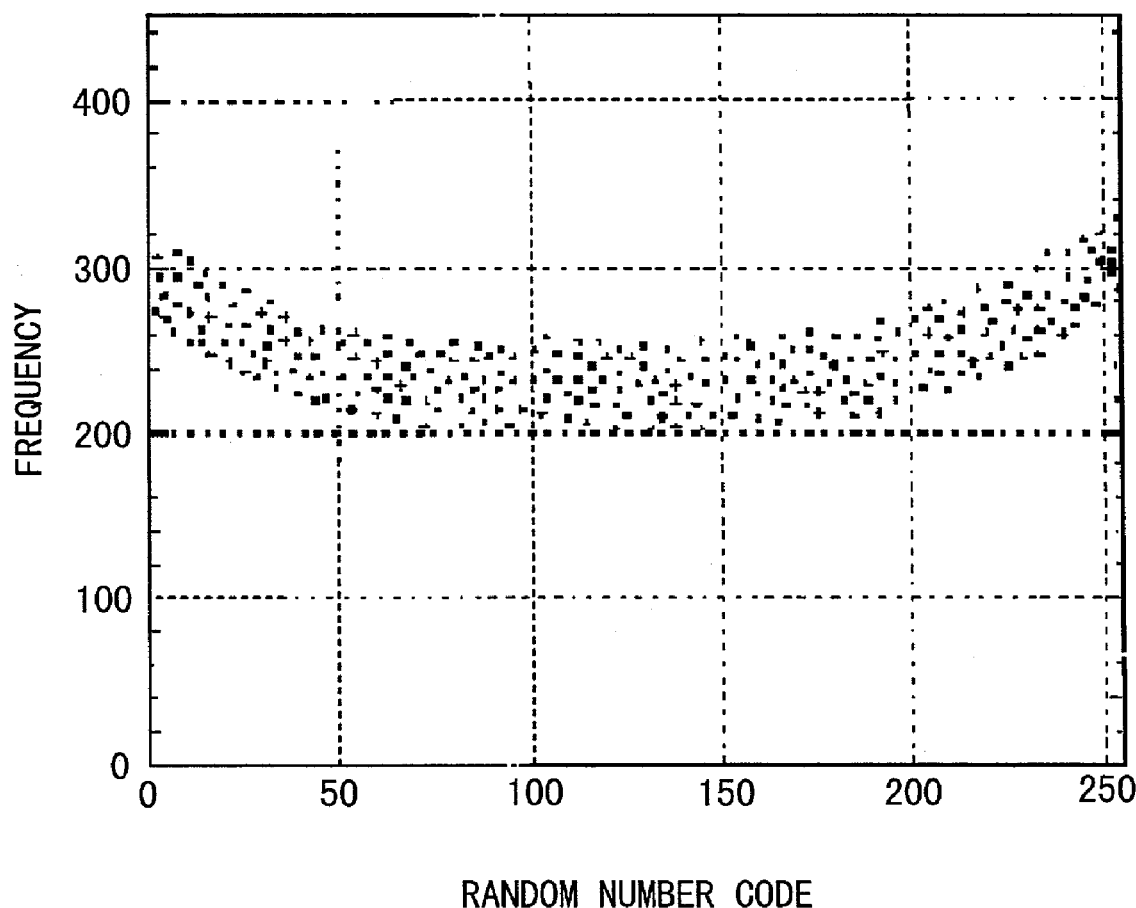
FIG. 17 is a graph showing a frequency distribution of random number codes generated by two counters.
Figure 18:
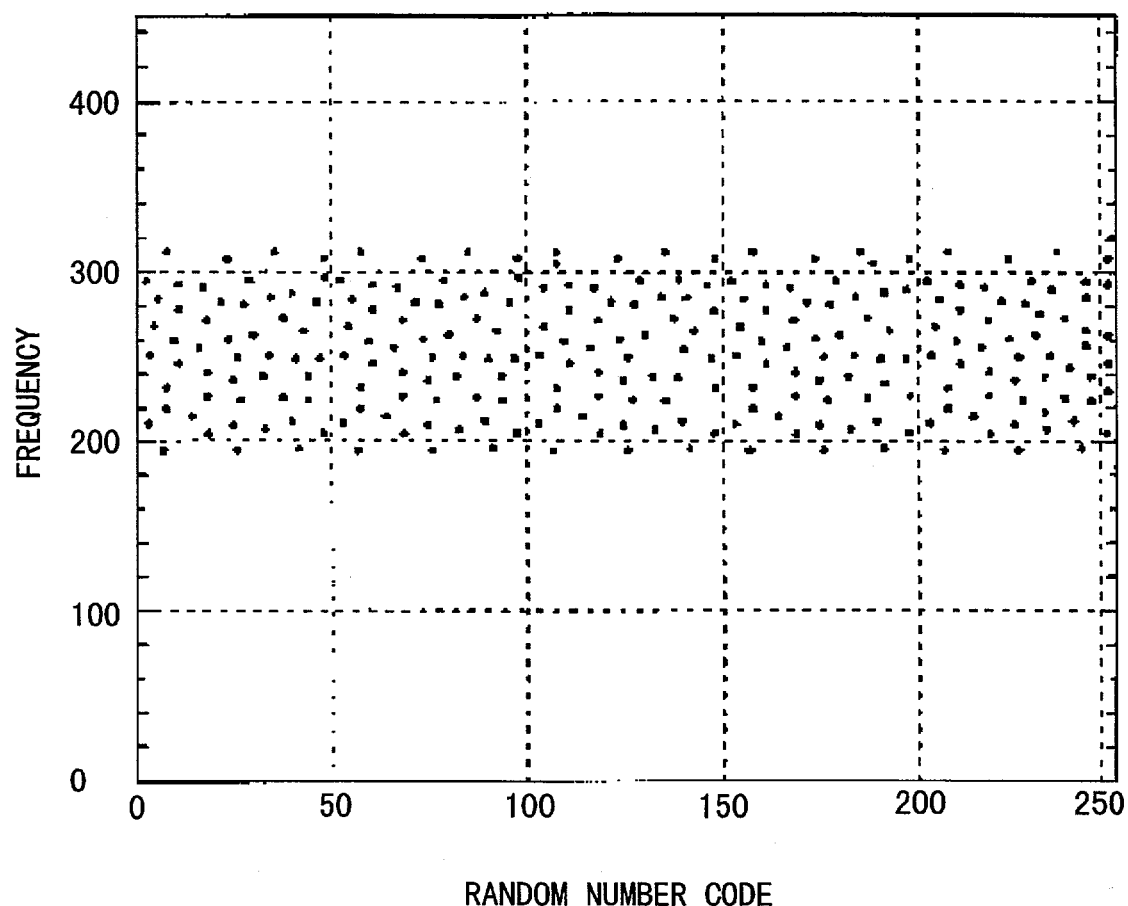
FIG. 18 is a graph showing a frequency distribution of a random number code.
Figure 19:
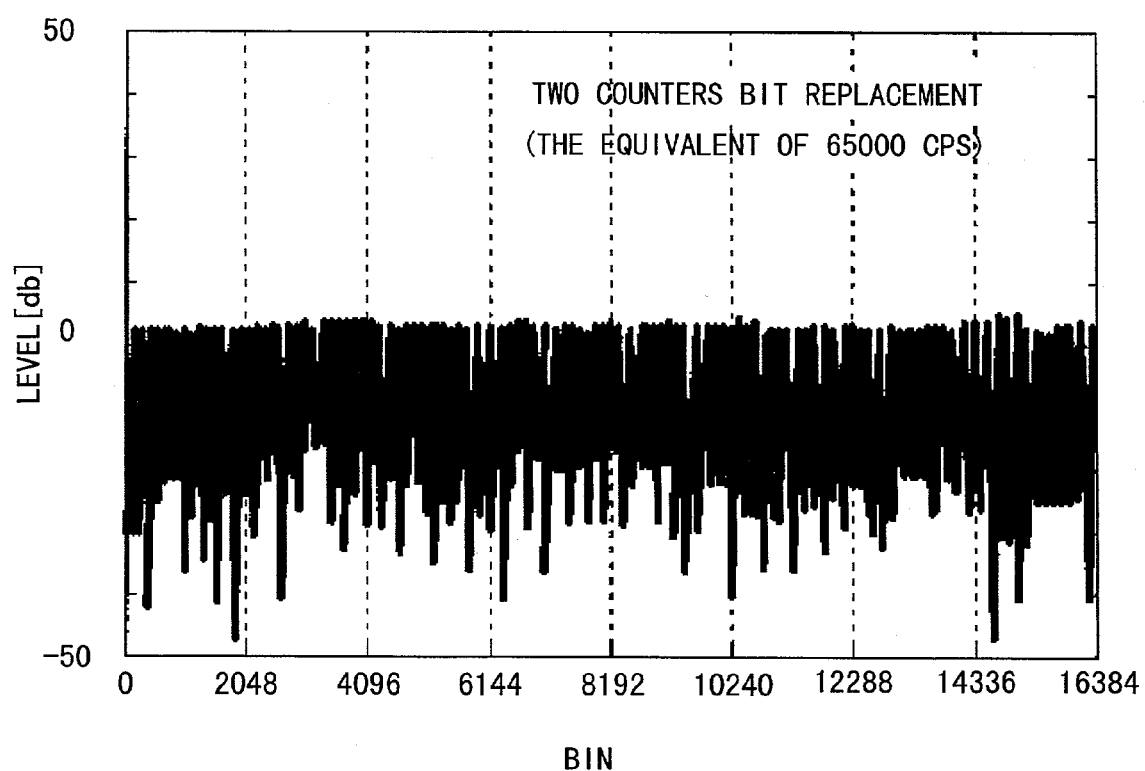
FIG. 19 is a graph showing an FFT result of a random number code.

FIG. 17 shows the frequency distribution in the combination of the random number codes 33-1, 33-2. This frequency distribution indicates the relaxation in the tendency that the frequency is smaller as the code indicated in the frequency distribution of the random number code 113 according to the conventional example is larger. FIG. 18 shows the frequency distribution of the random number code 34. This frequency distribution indicates that the random number code 34 does not present the tendency in which the frequency is changed depending on the size of the code. However, the difference between the standard deviation, the maximum value and the minimum value of the frequencies in the random number code 34 is substantially equal to that of the random number code 113 according to the conventional example. The uniformity is not improved. FIG. 19 shows the FFT result of the random number code 34. This FFT result indicates the absence of the spectrum, and the absence of the spectrum implies that there is no cyclic property in the random number code 34. A random number generator 21 according to this embodiment can be sufficiently applied to an apparatus in which a trouble is never induced by the uniformity of the random number code 34.

Figure 20:
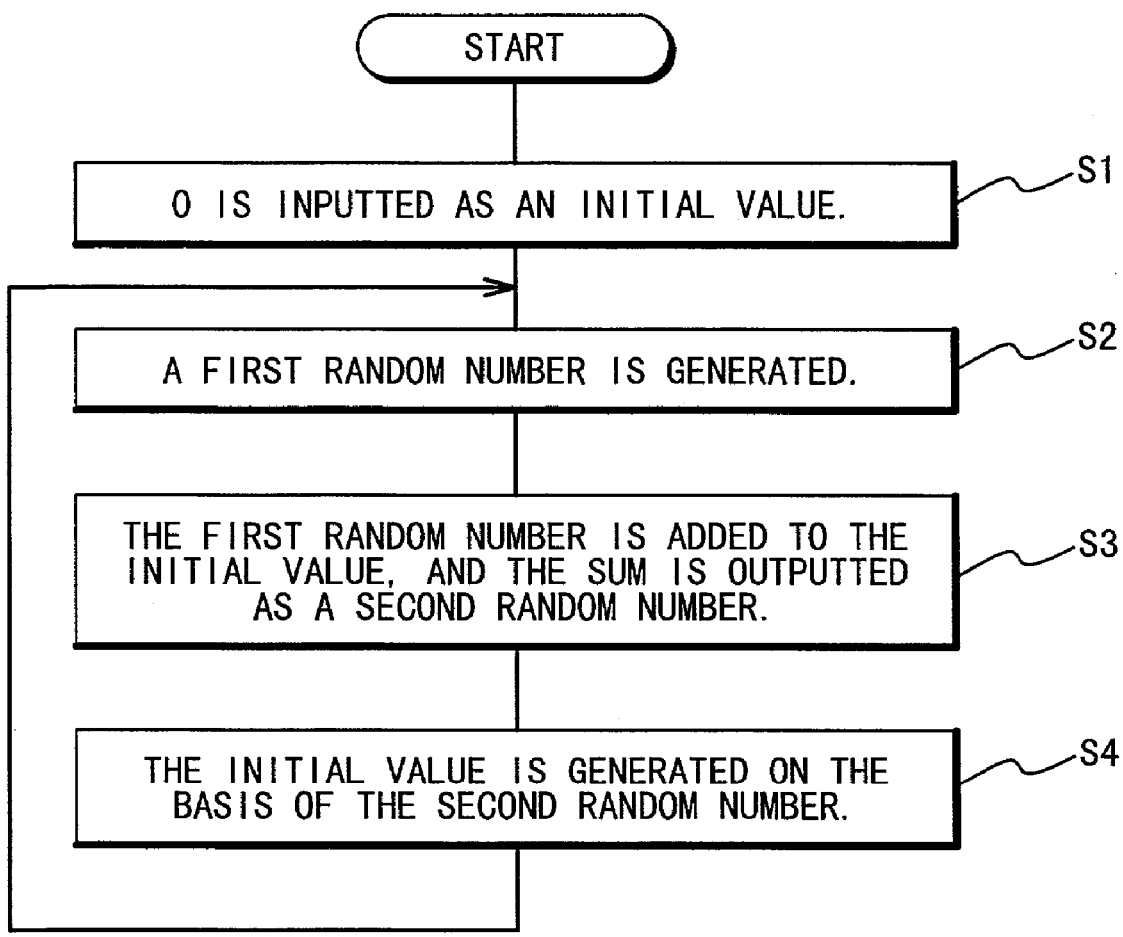
FIG. 20 is a flowchart showing an embodiment of a random number generating method according to the present invention.

FIG. 20 shows an embodiment of a random number generating method according to the present invention.

At first, 0 is inputted as an initial value (Step S1). A numeral except 0 may be inputted as the initial value. Next, a first random number is generated (Step S2). This first random number is a pseudo random number generated by a mathematic algorism. The first random number can be also generated on the basis of a physical phenomenon by a random number generator installed outside an information processing apparatus. The first random number is represented by a binary notation of 8 bits, and it is composed of 256 codes. It is allowable that the first random number does not have any uniformity.

Next, the first random number is added to the initial value, and the sum is outputted as a second random number (Step S3). If the sum is 256 or more, it is divided by 256, and its remainder is outputted as the second random number. Then, the initial value is generated on the basis of the second random number (Step S4). At this time, the second random number is represented by the binary notation of 8 digits. A first digit of the second random number is replaced by an eighth digit, a second digit is replaced by a seventh digit, a third digit is replaced by a sixth digit, and a fourth digit is replaced by a fifth digit, and the initial value is generated.

By the way, the initial value corresponds to the second random number code, in a one-to-one relationship, and a method of generating 256 ! kinds of initial values may be considered. All of the 256 ! kinds of the tables 9 are not always effective. The method of generating the initial value is undesirable in which the relative relation occurs before and after the conversion.

After the generation of the initial value, the operational flow proceeds to the loop composed of the steps S2 to S4. The second random number generated as mentioned above has the substantial uniformity similar to that of the random number generator according to the present invention, even if the first random number does not have the uniformity.

The random number generating method according to the present invention can be converted into the program for instructing the computer to execute and can be installed in an information processing apparatus, for example, such as a personal computer. The information processing apparatus including the program can generate the random number having the substantial uniformity, similarly to the random number generator according to the present invention.

The random number generator according to the present invention can generate the random number based on the uniform distribution.

What is claimed is:

1. A random number generator comprising:
   a random pulse generator generating a plurality of random pulses;
   a scrambler generating an initial value; and
   a counter generating a random number code based on said initial value and a temporal interval of said plurality of random pulses, and
   wherein said initial value is varied, and said initial value is not a fixed value,
   wherein said scrambler has a table,
   wherein said table correlates said random number code and said initial value to each other,
   wherein said scrambler generate said initial value corresponding to said random number code previously generated by said counter in reference to said table, and
   wherein the random number generator is configured to authenticate a person or encrypt data.

2. The random number generator of claim 1, wherein the random number generator is installed in an information processing apparatus.

3. The random number generator of claim 1, wherein the random number generator is adapted to improve security by one of detecting an illegal usage and setting a usage limit on a card.

4. A random number generating method, comprising:
   generating a plurality of random pulses;
   generating an initial value that is varied and is not a fixed value; and
   generating a random number code based on a temporal interval of said plurality of random pulses and said initial value;
   wherein a table correlates said random number code and said initial value to each other,
   wherein said initial value is generated corresponding to said random number code previously generated in reference to said table, and
   wherein the random number generating method is configured to improve security by detecting an illegal usage or setting a usage limit on a card.

5. The random number generating method of claim 4, wherein the random number generating method is performed by an information processing apparatus.

6. The random number generating method of claim 4, wherein the random number generating method is performed to one of authenticate a person and encrypt data.

* * * * *